June 3, 1969 H. E. HAYNES ET AL 3,448,211

MAGNETO-OPTIC DISPLAY SYSTEM

Filed Oct. 20, 1965

INVENTORS
HAROLD E. HAYNES &
KENNETH C. HUDSON

Edward J. Norton
Attorney

United States Patent Office 3,448,211

Patented June 3, 1969

3,448,211

MAGNETO-OPTIC DISPLAY SYSTEM

Harold E. Haynes, Haddonfield, N.J., and Kenneth C. Hudson, Philadelphia, Pa., assignors to Radio Corporation of America, a corporation of Delaware Filed Oct. 20, 1965, Ser. No. 498,458
Int. Cl. H04n 3/16, 5/38
U.S. Cl. 178—7.3 7 Claims

ABSTRACT OF THE DISCLOSURE

A technique utilizing a rotating headwheel with head gaps oriented to produce magnetomotive force parallel to the direction of movement of a recording medium in recording bit information pictorially or otherwise on a loop of the magnetic recording medium in nearly real time. The bit information is transferred to a magnetic thin film for read out by magneto-optic image display means. Amplitude and width modulation of the signal applied to the recoding head may be utilized to obtain virtual gray scale in the displayed image.

This invention relates to a magneto-optic display system and, more particularly, to recording techniques for use in such a system.

It is often desired to provide a moving "strip-map" optical display for a scanner employed, for example, in an infrared, sonar or radar system. Further, in many systems it is desired to provide an optical display of narrow-band video and related types of signals. In these cases the use of the Kerr magneto-optic effect to provide an optical output of an image stored on a magnetic surface medium, such as a magnetic tape or drum, is particularly advantageous, since viewing by Kerr magneto-optic effect eliminates the need for complicated electronic playback which is needed for kinescope display and viewing of the recorded data. The wear unavoidably experienced by the magnetic medium when conventional magnetic read-out thereof is employed is also eliminated.

Kerr magneto-optic effect read-out of thin single domain magnetic films is inherently capable of only reading out image information which is in binary form, i.e., each elemental area of the image is either all "black" or all "white." Thus, an image read-out by the Kerr magneto-optic effect has no "gray" scale. Since this is the case, in order to obtain a high-resolution image, it is necessary to provide a high packing density of image bit information on the magnetic medium. Further, in order to provide a high degree of clarity in an optical display which is moving, it is essential to avoid any "smearing" of the image bit information in the process of reading out this information by the Kerr magneto-optic effect. To prevent such "smearing," the direction of the magnetomotive force produced by the respective dots of remanent magnetization on the magnetic medium corresponding to each bit of image information should be oriented parallel to the direction of movement thereof. As will be described, this provides reliable switching of the magnetization of a magnetic thin film from the magnetic medium.

The present invention is primarily directed to a recording technique for recording bits of image information on a magnetic medium with a high packing density in a manner such that the magneto-motive force produced by the respective dots of remanent magnetization corresponding to each bit has a direction which is parallel to the direction of movement of the magnetic medium. The present invention is further directed to a recording technique for time width-modulating and track width-modulating the respective dots of remanent magnetization on the magnetic medium corresponding with each bit in accordance with an applied video signal to provide the image optically displayed by the Kerr magneto-optic effect with a virtual "gray" scale, similar to the effect of half-tone in printing.

It is therefore an object of the present invention to provide an improved Kerr magneto-optic effect image display system.

It is a further object of the present invention to provide a Kerr magneto-optic effect image display system with extremely high resolution.

It is a still further object of the present invention to provide a high resolution Kerr magneto-optic effect moving optical display.

It is another object of the present invention to provide high packing density storage of image bits on a magnetic medium to be viewed by the Kerr magneto-optic effect.

It is still another object of the present invention to provide an optical image display viewed by the Kerr magneto-optic effect having a virtual "gray" scale.

These and other features, objects and advantages of the present invention will become more apparent from the following detailed description taken together with the accompanying drawings, in which.

Figure 1:
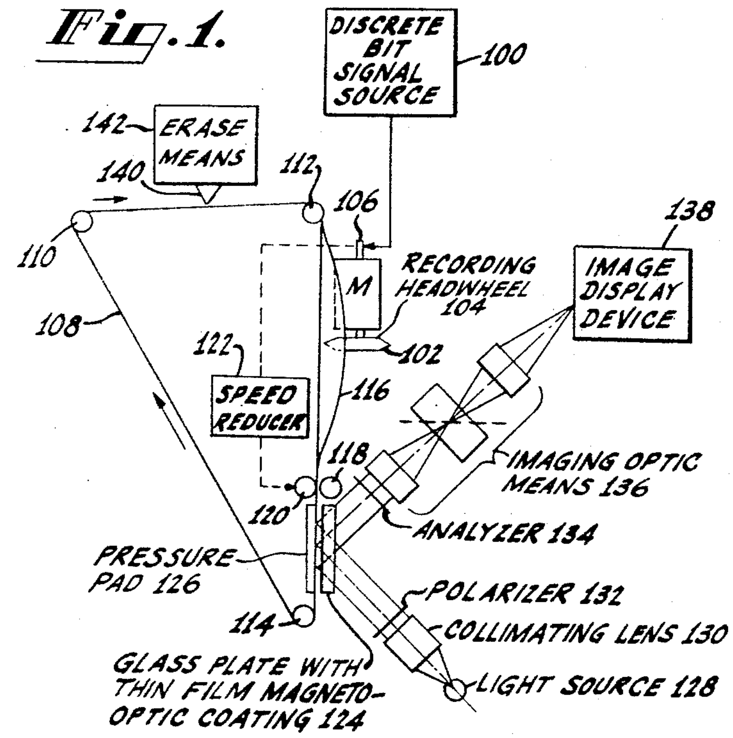
FIG. 1 is a block diagram of a preferred embodiment of the system contemplated by the present invention.

Referring now to FIG. 1, there is shown discrete bit signal source 100, which may merely produce an output wherein each bit representing one binary value is manifested by the presence of a pulse of given polarity and each bit representing the other binary value is manifested by the absence of a pulse, or, in the alternative, eah bit representing one binary value is manifested by a pulse of given polarity and each bit representing the other binary value is represented by a pulse of a polarity opposite to this given polarity. However, discrete bit signal source 100 is preferably of the type shown in FIG. 2, and produces output pulses of a given polarity which are both width and amplitude modulated in accordance with a video signal.

Figure 2:
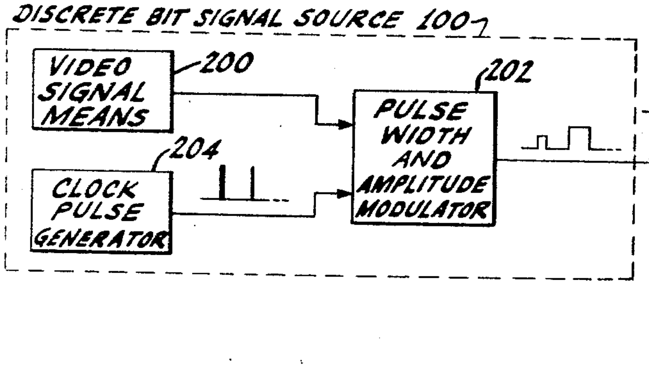
FIG. 2 is an embodiment of the discrete bit signal source shown in FIG. 1.

As shown in FIG. 2, the discrete bit signal source 100 comprises video signal means 200, which applies a video signal as a first input to pulse width and amplitude modulator 202, and a clock pulse generator 204, which applies a series of isochronous clock pulses as a second input to pulse width and amplitude modulator 202. Pulse width and amplitude modulator 202 may comprise a multivibrator which is set in response to each clock pulse and which is reset after a time interval following the occurrence of each clock pulse, the length of the time interval depending upon the instantaneous amplitude and polarity of the video signal then being applied thereto. In addition, the operating voltage applied to the multivibrator can be amplitude modulated with the video signal. Thus, pulse width and amplitude modulator 202 will produce as an output an individual pulse of given polarity in response to the occurrence of each clock pulse applied thereto which has its leading edge in coincidence with the occurrence of that clock pulse and its lagging edge occurring after a time interval following the occurrence of that clock pulse which depends on the instantaneous amplitude and polarity of the video signal then being applied to pulse width and amplitude modulator 202. In addition, the amplitude of each pulse will depend on the instantaneous amplitude and polarity of the video signal then being applied to pulse width and amplitude modulator 202. Therefore, each output pulse from pulse width and amplitude modulator 202 will be modulated in two dimensions, as shown.

Returning now to FIG. 1, the successive discrete bits emanating from discrete bit signal source 100 are applied to one or more magnetic heads of recording headwheel 102, which is rotated at high speed by motor 104, through slip rings or commutator 106.

Figures 3A, 3B, 4:
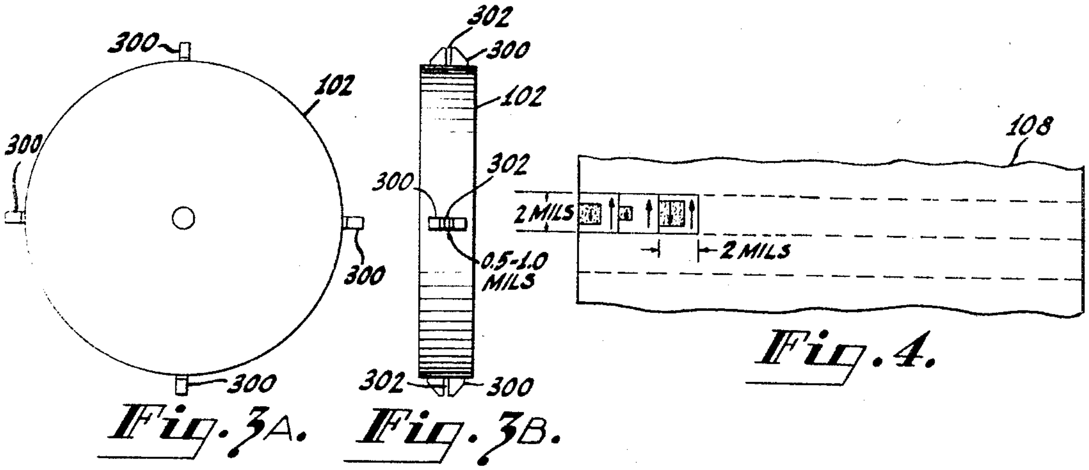
FIGS. 3A and 3B are views of the recording headwheel shown in FIG. 1.
FIG. 4 illustrates the dots of remanent magnetization recorded on the magnetic medium when the preferred discrete bit signal source shown in FIG. 2 is employed in the system shown in FIG. 1.

Recording headwheel 102, which is shown in detail in FIGS. 3A and 3B, is similar to but differs in two important respects from the conventional quadraplex recording headwheels employed in television video magnetic tape recorders. More particularly, as shown in FIG. 3A, recording headwheel 102 has four magnetic heads 300 equally spaced at ninety degree intervals about the circumference thereof. As shown in FIG. 3B, each of the magnetic heads 300 is oriented with the short dimension or width of its gap 302 perpendicular to the plane of headwheel 102 and with the long dimension or length of its gap 302 oriented parallel to the plane of headwheel 102. Furthermore, the width of the gap 302 of each magnetic head 300 is of a predetermined value within a range between 0.5 and 1.0 mil. On the other hand, although the conventional recording headwheel employed in television video magnetic tape recorders also consist of four magnetic heads equally spaced at ninety degree intervals about the circumference of the headwheel, it differs from the headwheel shown in FIGS. 3A and 3B in that, in the case of a conventional recording headwheel employed in television video magnetic tape recording, each of the magnetic heads is oriented with its short dimension or width parallel to the plane of the headwheel and with its long dimension or length oriented perpendicular to the plane of the headwheel. Further, the width of the gap of each of the magnetic heads utilized in the recording headwheel employed in conventional television video tape recorders is only 0.1 mil.

Returning again to FIG. 1, recording headwheel 102 is located in cooperative relationship with a closed loop of magnetic tape 108, which may have a width of two inches, for instance. As shown, magnetic tape 108 is supported by rollers 110, 112 and 114 and passes over guide member 116 which maintains the portion of magnetic tape 108 in cooperative relationship with recording headwheel 102 in close proximity thereto. Recording headwheel 102 is oriented perpendicular with respect to the length of magnetic tape 108, as shown, so that each magnetic recording head 300 thereof scans transversely over the width of magnetic tape 108 as recording headwheel 102 rotates. Further, the loop of magnetic tape 108 is continuously moved at a relatively low speed in a clockwise direction in synchronism with the rotation of recording headwheel 102 by means of idler roller 118 and capstan 120, which is linked to motor 104 through speed reducer 122.

Magnetic transfer means 124 are positioned in cooperative relationship with a region of magnetic tape 108 at a point which, with respect to the direction of movement of magnetic tape 108, is beyond recording headwheel 102, the magnetic transfer means 124 being located on one side of magnetic tape 108. Magnetic transfer means 124 comprises a transparent glass plate backing having a thin film magneto-optic coating of relatively high remanence and relatively low coercivity in proximity with and magnetically linked to magnetic tape 108. On the other side of magnetic tape 108, in cooperative relationshiw with magnetic transfer means 124, is pressure pad 126 for maintaining magnetic tape 108 in close proximity to magnetic transfer means 124.

The thin film magneto-optic coating of magnetic transfer means 124 is irradiated through the transparent glass backing thereof by a beam of plane-polarized incident light obtained from light source 128 which has been passed through collimating lens 130 and polarizer 132. The thin film magneto-optic coating of magnetic transfer means 124, when so irradiated, will reflect a beam of light which is passed through polarizing analyzer 134 and then through imaging optic means 136 to produce a light image on image display device 138. Image display device 138 may be an image intensifier, in which case the reflected beam imaged by imaging optic means 136 is directed to the photocathode thereof, or, in the alternative, image display device 138 may be a television camera tube, such as an image orthicon. An image orthicon provides versatility in the size of the viewed image, but its resolution capability is not as great as that achievable for an image intensifier.

An erase head 140 of erase means 142 is positioned in cooperative relationship with a region of magnetic tape 108, with respect to the direction of movement of magnetic tape 108, is beyond magnetic transfer means 124 and before the recording means 102. Erase means 142 applies a D.C. signal to erase head 140 of a magnitude sufficient to saturate the entire area of magnetic tape 108 in cooperative relationship therewith. The orientation of erase head 140 with respect to magnetic tape 108 is such as to provide a remanent magnetization of magnetic tape 108 having a magnetomotive force which is in a first direction parallel to the direction of movement of magnetic tape 108.

Considering now the operation of the system shown in FIG. 1, magnetic tape 108 is continuously moved at a relatively low speed, such as two inches per second, for instance. It will be seen that due to the presence of erase means 142, the region of magnetic tape 108 which moves into cooperative relationship with recording headwheel 102 will always be saturated with a remanent magnetization having a magnetomotive force oriented in the aforesaid first direction parallel to the direction of movement of magnetic tape 108.

Recording headwheel 102 is continuously rotated at a high speed, such as 14,000 r.p.m., for instance. The bits emanating from discrete bit signal source 100 are either simultaneously applied as inputs to all the magnetic heads 300 of recording headwheel 102 or, in the alternative, commutator 106 serves to switch the applied bits to only that magnetic head which is then in scanning relationship with magnetic tape 108. In any case, each of the bits of the aforesaid given polarity applied to the particular magnetic head 300 which is then in scanning relationship with magnetic tape 108 is effective during its time of occurrence to saturate the elemental region of magnetic tape 108 which is magnetically linked to this head during this time with a remanent magnetization having a magnetomotive force parallel to the direction of movement of magnetic tape 108 which is opposite to the aforesaid first direction. The bits can be made by the selective saturation of the elemental regions to form on the tape the corresponding black and white areas of a picture to be reproduced by the display device 138. Alternatively, the bits may result in a pattern on the film 108 which is other than pictorial in nature.

Since many bits are applied to each magnetic head 300 during a single transverse scan thereof across the width of magnetic tape 108, each scan of magnetic tape 108 by a magnetic head 300 will result in a substantially transverse track of bits being recorded on magnetic tape 108. The maximum width of such a track will be approximately double the gap width of the magnetic recording head. Therefore, since the maximum gap width of each of magnetic recording heads 300 is one mil, the maximum trackwidth will be about two mils. Furthermore, since only the trailing edge of the gap is influential in recording, the resolution of bits along the track may easily be at least as good as two mils, although the long dimension of the gap may be actually as much as ten mils. Thus, each bit produces a maximum sized dot of remanent magnetization on magnetic tape 108 which occupies an area of no more than two-by-two mils. If the gap width of each of magnetic heads 300 is even less than one mil, the maximum sized dot of remanent magnetization produced by each bit will have even a smaller area.

With a tape speed of two inches per second and a speed of rotation of recording headwheel 102 of 14,400 r.p.m., a track will have a pitch of approximately two mils. Therefore, each successive track will begin substantially immediately beneath the preceding track, so that successive tracks will be arranged in a column parallel to the direction of movement of magnetic tape 108 with each track located one immediately beneath the other. Thus, the packing density of the recorded bits is quite high, to provide a high resolution image in which detail is not lost.

Reference is now made to FIG. 4, which illustrates a recorded track made up of a plurality of dots of remanent magnetization corresponding to successively recorded amplitude and time width modulated pulses, where discrete bit signal source 100 is of the type shown in FIG. 2. As shown, each elemental area of a track, corresponding to the time interval between successive clock pulses, is made up of a first remanent magnetization portion having a magnetomotive force parallel to the direction of movement of tape 108 as indicated by the arrow in the downward direction and a second remanent magnetization portion having a magnetomotive force parallel to the direction of movement of tape 108 as indicated by the arrow in the upward direction. The relative size of the two portions in their dimension parallel to the track direction depends solely on the degree of time width modulation experienced by the bit corresponding thereto, which, in turn, depends upon the instantaneous amplitude and polarity of the applied video signal controlling the width of that bit. Similarly, the relative size of the remanent magnetization portions in the dimension perpendicular to the track direction depends on the degree of amplitude modulation experienced by the bit corresponding thereto.

Although not shown, in the case where discrete bit signal source 100 is a conventional binary source, rather than a source of amplitude and width modulated pulses, each entire elemental area of the track will comprise a dot of remanent magnetization having a magnetomotive force parallel to the direction of movement of magnetic tape 108, with each bit representing one binary value being manifested by an upward magnetomotive force and each bit representing the other binary value being manifested by a downward magnetomotive force.

In any event, the successive tracks of bit information, after being recorded on magnetic tape 108, will move into cooperative relationship with magnetic transfer means 124. Since magnetic transfer means 124 is magnetically linked to the region of magnetic tape 108 in cooperative relationship therewith, the bit information recorded on magnetic tape 108 is transferred as a magnetic pattern to the thin film magneto-optic coating of magnetic transfer means 124.

The light from light source 128, after being passed through collimating means 130 and polarizer 132 forms a beam of light which is plane polarized at a predetermined angle which depends upon angular orientation of polarizer 132. This beam of plane polarized light, after being passed through the glass backing of magnetic transfer means 124, is reflected from the thin film magneto-optic coating thereof. Due to the Kerr magneto-optic effect, the angle of polarization of each point in the resulting beam of reflected light is rotated either in a clockwise or counter clockwise direction in accordance with the direction of magnetomotive force of each dot of remanent magnetization in this magnetic pattern.

The beam of reflected light is passed through polarizing analyzer 134, which may be oriented at a predetermined angle, such as eighty nine degrees, with respect to the orientation of polarizer 132. This results in the polarization of each point of the beam of reflected light emerging from polarizing analyzer 134 being converted into an equivalent light intensity. More particularly, those points of the beam of reflected light which have had their polarization rotated in one direction are increased in light intensity, while those points of the beam of reflected light which have had their polarization rotated in the other direction are decreased in light intensity. Thus, the beam of reflected light emerging from polarizing analyzer 134 contains an optical image corresponding to the bit information recorded on magnetic tape 108. This optical image is focused by imaging optic means 136 on image display device 138, so that it can be directly viewed.

Since the direction of the magnetomotive force of each dot of remanent magnetization corresponding to each bit on magnetic tape 108 is always parallel to the direction of movement of tape 108, reliable switching with an absence of "smearing" takes place in the transfer of this information to magnetic transfer means 124 and in the image displayed by image display device 138, although magnetic tape 108 may be continuously moving. The entire image merely travels along the magneto-optic surface in synchronism with the tape motion when magnetic tape 108 is moving.

It will be seen that the present invention makes is possible to optically view the bit information supplied by discrete bit signal source 100 practically in real time, the only time delay being the slight time required for magnetic tape 108 to move the small distance from recording headwheel 102 to magnetic transfer means 124. In addition, the same relatively small length of magnetic tape 108, connected in a loop as shown, may be used over and over again to record and readout applied bit information.

Although in the preferred embodiment of the invention a loop of magnetic tape is employed, a magnetic drum, of course, could be substituted therefor. Also, it is possible to employ a long length of magnetic tape wound on a reel, rather than a closed loop of magnetic tape. In this latter case, the magnetic tape, after being fed through the system, is wound up on a take-up reel.

Although only certain embodiments of the present invention have been described herein, it is not intended that the invention be restricted thereof, but that it be limited only by the true spirit and scope of the appended claims.

What is claimed is:

1. The combination comprising a magnetic recording surface medium which is movable in a given direction, recording means for recording discrete bits of information on said medium, and magneto-optic means for displaying a visual image of said recorded information; wherein said recording means comprises a rotating headwheel in cooperative relationship with said medium including at least one magnetic recording head oriented to scan said medium in a direction perpendicular to said given direction as said headwheel rotates, said head including a gap oriented to produce a magnetomotive force thereacross parallel to said given direction in response to a signal being applied thereto, and a signal source coupled to said head for applying a series of discrete bits of information to be recorded to said head during a scan of said medium by said head; and wherein said magneto-optic means comprises magnetic transfer means located in cooperative relationship with a portion of said medium having had said information recorded thereon, said transfer means including a backing having disposed thereon a magnetic thin film which is magnetically linked to said portion of said medium, whereby said information recorded on said medium is transferred to said magnetic thin film as a magnetic pattern in response to said medium being passed thereby, a light image display device, means for irradiating said magnetic film with a beam of plane polarized incident light to obtain therefrom a beam of reflected light each point of which is polarized in accordance with said magnetic pattern, a polarization analyzer oriented at a predetermined angle with respect to the polarization of said incident light in the path of said beam of reflected light for converting the polarization of each point of said beam of reflected light into an equivalent light intensity, and imaging means for imaging the beam of reflected light emerging from said analyzer on said light image display device.

2. The combination defined in claim 1, wherein said medium is continuously moved in said given direction at a given speed and said headwheel is continuously rotated at a speed which is much higher than but synchronous with said given speed, and wherein said headwheel includes a plurality of said heads equally spaced on said wheel for sequentially scanning said medium during each rotation of said headwheel in a manner such that each head comes into scanning relationship with said medium after the preceding head comes out of scanning relationship with said medium, said signal source being coupled at least to that head which is then in scanning relationship with said medium, whereby a plurality of transversely disposed tracks of recorded information arranged in a column parallel to said given direction with each track located one immediately beneath the other are recorded on said medium.

3. The combination defined in claim 2, wherein the size of said gap is such as to provide each track with a width parallel to said given direction which has a maximum value no greater than two mils.

4. The combination defined in claim 1, wherein said signal source includes means for pulse-width modulating each bit applied to said head in accordance with a video signal.

5. The combination defined in claim 1, wherein said signal source includes means for amplitude modulating each bit applied to said head in accordance with a video signal.

6. The combination defined in claim 1, wherein said signal source includes means for both pulse-width modulating and amplitude modulating each bit applied to said head in accordance with a video signal.

7. The combination defined in claim 1, wherein said medium is in the form of a closed loop, wherein said transfer means is located to be in cooperative relationship with said medium at a region thereof with respect to said given direction which is beyond the region thereof located in cooperative relationship with said headwheel, said combination further including erase means located in cooperative relationship with said medium at a region thereof with respect to said given direction which is beyond the region thereof located in cooperative relationship with said transfer means.

References Cited

UNITED STATES PATENTS

| | | |
|---|---|---|
| 2,965,708 | 12/1960 | Witt. |
| 3,196,206 | 7/1965 | Griffiths. |
| 3,267,212 | 8/1966 | Goldmark. |

ROBERT L. GRIFFIN, *Primary Examiner.*

HOWARD W. BRITTON, *Assistant Examiner.*

U.S. Cl. X.R.

178—6.6; 179—100.2; 346—74